United States Patent
Hagino

(10) Patent No.: US 7,796,183 B2
(45) Date of Patent: Sep. 14, 2010

(54) FOCUS STATE DISPLAY

(75) Inventor: Yoshio Hagino, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 992 days.

(21) Appl. No.: 10/532,051

(22) PCT Filed: Oct. 23, 2003

(86) PCT No.: PCT/JP03/13537

§ 371 (c)(1),
(2), (4) Date: Apr. 21, 2005

(87) PCT Pub. No.: WO2004/038476

PCT Pub. Date: May 6, 2004

(65) Prior Publication Data

US 2006/0044452 A1    Mar. 2, 2006

(30) Foreign Application Priority Data

Oct. 24, 2002    (JP) .............................. 2002-309942

(51) Int. Cl.
H04N 5/232    (2006.01)
H04N 5/222    (2006.01)
(52) U.S. Cl. ................... 348/346; 348/345; 348/349; 348/353; 348/354; 348/333.02
(58) Field of Classification Search ............... 348/345, 348/346, 347, 349, 350, 351, 352, 353, 354, 348/360, 361, 333.01, 333.02, 207.99, 208.15, 348/231.2, 231.3, 231.4, 231.6
See application file for complete search history.

(56) References Cited

U.S. PATENT DOCUMENTS 4,319,238 A * 3/1982 Ogasawara et al. ........... 345/38

(Continued)

FOREIGN PATENT DOCUMENTS

JP        56-18929 U        7/1979

(Continued)

*Primary Examiner*—David L Ometz
*Assistant Examiner*—Peter Chon
(74) *Attorney, Agent, or Firm*—Birch, Stewart, Kolasch & Birch, LLP

(57) ABSTRACT

A portable telephone 10 comprises: focus state judging means 30 for judging whether or not an image captured from a camera 12 is in a focus state; focus state display means 31 for indicating both the focus state and a focus direction with the LED 13 and/or through the speaker 14; focus state storage means 32 for storing the temporal progress of the focus states of images obtained by the focus state judging means 30 with the temporal progress of the captured images; focus direction judging means 33 for judging a focus direction from the temporal progress of the focus states obtained by the focus state storage means 32; display sections 15 and 16 for displaying character information, image information, and the focus state; an LED 13 for displaying the focus state by emitting light; and a speaker 14 for informing about the focus state with voice or sound. By this configuration, this invention can provide a focus state display, a portable terminal device, an information indication program, and a recording medium that stores the program each of which makes it possible for a user to judge the focus state of a camera easily and enables easy confirmation and adjustment of the focus.

22 Claims, 6 Drawing Sheets

U.S. PATENT DOCUMENTS

| | | | |
|---|---|---|---|
| 5,499,074 A * | 3/1996 | Ohsawa et al. | 396/121 |
| 5,506,654 A | 4/1996 | Kim | |
| 6,081,670 A | 6/2000 | Madsen et al. | |
| 6,359,650 B1 * | 3/2002 | Murakami | 348/333.04 |
| 6,545,715 B1 * | 4/2003 | Na | 348/351 |
| 6,570,621 B2 * | 5/2003 | Bigler et al. | 348/372 |
| 6,937,284 B1 * | 8/2005 | Singh et al. | 348/346 |

FOREIGN PATENT DOCUMENTS

| | | |
|---|---|---|
| JP | 58-91438 A | 5/1983 |
| JP | 2-74934 A | 3/1990 |
| JP | 3-260638 A | 11/1991 |
| JP | 5-119385 A | 5/1993 |
| JP | 5-183796 A | 7/1993 |
| JP | 7-143388 A | 6/1995 |
| JP | 7-301846 A | 11/1995 |
| JP | 8-43918 A | 2/1996 |
| JP | 10-96990 A | 4/1998 |
| JP | 2002-196225 A | 7/2002 |
| JP | 2003-161983 A | 6/2003 |
| KR | 2002-0078735 A | 10/2002 |
| WO | WO-02-099495 A1 | 12/2002 |

* cited by examiner

FOCUS STATE DISPLAY

TECHNICAL FIELD

This invention relates to a focus state display that indicates a focus state of a digital camera, a portable telephone with a camera, a portable terminal device, etc., a portable terminal device, an information indication program, and a recording medium in which a program is recorded.

BACKGROUND ART

In recent years, the development of small-sized and low-power-consumption image sensors has enabled portable devices, such as PDA (Personal Digital Assistant) and a portable telephone, to have built-in cameras. This makes it possible to take a picture of a printed matter with the built-in camera in stead of a memorandum and send it by e-mail instantaneously. These built-in cameras give top priority to small size, thereby having lower resolution than the usual digital camera.

Generally, the portable terminal device does not have a built-in automatic focusing device because there are limits to the size of a case and the cost. Therefore, it is necessary to achieve proper focusing by confirming a taken image with a display device built into the portable terminal device.

As a focus state display for the autofocus camera, for example, there is a device disclosed in Patent document 1. This device has two or more segments on its display screen, and indicates a focus state with a combination of some segments. Patent document 2 discloses a device that generates differential image data by extracting high spatial frequency components of image data, changes arrangement of color according to values of pixels having high frequency components of this data, and informs a user of a focus state by the difference in colors.

Patent document 1: JP-A No. 96990/1998
Patent document 2: JP-A No. 196225/2002

However, in these conventional portable terminal devices with cameras, since their monitors were too small to check the focus state, it was difficult to pick up correctly focused images.

That is, since the display device built into the portable terminal device was small and had a small number of pixels, when the user tried to achieve proper focusing by judging blurring of an image on the monitor with the naked eye, the focus state was unclear, and consequently the user hardly achieved proper focusing.

This invention is devised in view of such a problem, and has as object to provide a focus state display, a portable terminal device, an information indication program, and its program whereby the user can easily judge the focus state of a camera and can easily perform confirmation/adjustment of an in-focus state.

DISCLOSURE OF THE INVENTION

A focus state display of this invention is characterized by having focus state judging means for judging whether or not an image captured from imaging means is in a focus state, and focus state display means that indicates information about its focus state on display means according to the focus state obtained by the focus state judging means.

The focus state display of this invention comprises: focus state judging means for judging whether or not an image captured from imaging means is in a focus state; focus state storage means for storing temporal progress of the focus states of the images obtained by the focus state judging means with the temporal progress of the captured images; focus direction judging means for judging a focus direction from the temporal progress of the focus states obtained by the focus state storage means; and focus state display means for indicating both information about its focus state and focus direction on display means according to the focus direction obtained by the focus direction judging means.

The focus state display means may indicate the focus state obtained by the focus state judging means using graphic forms as many as a number according to the focus state.

The focus state display means may indicate the focus direction obtained by the focus direction judging means with a symbol.

The focus state display means may further comprise light emitting means, and may indicate the focus state obtained by the focus state judging means by making the light emitting means blink or turn on.

The focus state display means may further comprise sounding means for emitting voice or sound, and may inform about the focus state obtained by the focus state judging means by making the sounding means emit voice or sound.

The focus state display means may further comprise filtering means for eliminating high spatial frequency components of the image data, and may display the image data with a wider range of high spatial frequency components of the image data eliminated by the filtering means, as the focus state becomes worse by checking the focus state obtained by the focus state judging means.

The portable terminal device of this invention is a portable terminal device comprising imaging means for picking up an image and display means for displaying the image obtained by the imaging means, characterized by further comprising the focus state display according to any of claims 1 through 7.

This invention is a program that makes a computer execute focus state display comprising the focus state judging means for judging whether or not the image captured from the imaging means is in a focus state and the focus state display means for indicating information about its focus state on the display means according to the focus state obtained by the focus state judging means.

Moreover, this invention is a program that makes a computer execute a focus state display comprising: focus state judging means for judging whether or not an image captured from the imaging means is in a focus state; focus state storage means for storing the temporal progress of the focus states of the images obtained by the focus state judging means with the temporal progress of the captured images; focus direction judging means for judging a focus direction from the temporal progress of the focus states obtained by the focus state storage means; and focus state display means for indicating information about its focus state and focus direction on display means according to the focus direction obtained by the focus direction judging means. Furthermore, this invention is a computer-readable recording medium characterized by recording a program that makes a computer execute a focus state display comprising: focus state judging means for judging whether or not an image captured from the imaging means is in a focus state; and focus state display means for indicating information about its focus state on display means according to the focus state obtained by the focus state judging means.

Still more, this invention is a computer-readable recording medium, characterized by recording a program that makes a computer execute a focus state display comprising: focus state judging means for judging whether or not an image capture from the imaging means is in a focus state; focus state storage means for storing the temporal progress of focus states of the images obtained by the focus state judging means with the temporal progress of the captured images; focus direction judging means for judging a focus direction from the temporal progress of the focus states obtained by the focus state storage means; and focus state display means for indicating information about its focus state and focus direction on the display means according to a focus direction obtained by the focus direction judging means.

BEST MODE FOR CARRYING OUT THE INVENTION

In order to describe this invention in more detail, this invention will be described referring to attached drawings.

First Embodiment

Figure 1A:
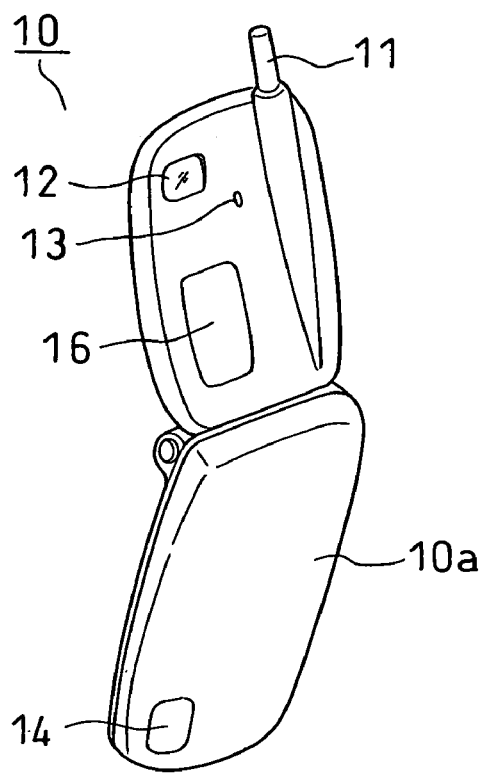
FIG. 1A is an illustration showing external appearance of a portable terminal device of a first embodiment of this invention.
Figure 1B:
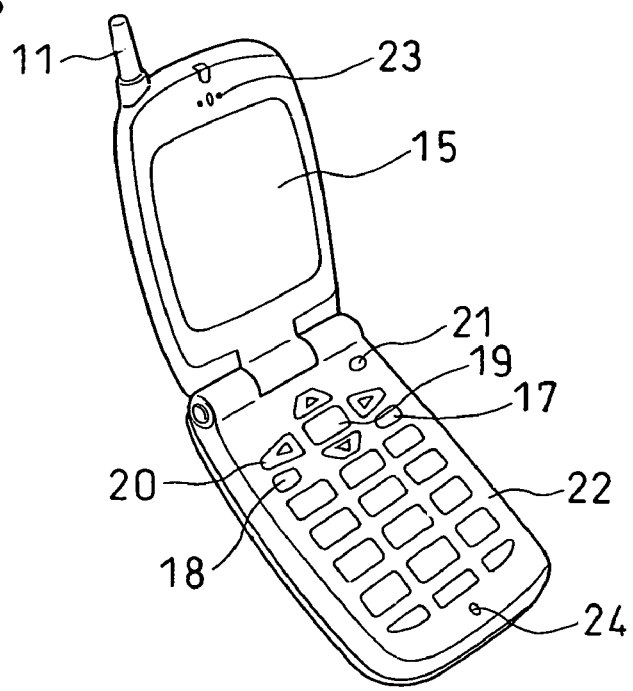
FIG. 1B is an illustration showing external appearance of the portable terminal device of this embodiment.

FIG. 1 is an illustration showing external appearance of a portable terminal device of a first embodiment of this invention. FIG. 1A is its backside perspective view, and FIG. 1B is its front side perspective view. The portable terminal device of this embodiment is an example where the focus state display is applied to a portable telephone or PHS (Personal Handy-Phone System) with a camera. In FIGS. 1A and 1B, the numeral 10 is a portable telephone with a camera (portable terminal device). A body 10a of the portable telephone 10 comprises: an antenna 11 for performing wireless communications; a camera 12 (imaging means) that is an imager built into on the back of the body 10a and picks up image information; an LED 13 (light emitting means) that is built into on the back of the body 10a and informs about a focus state by its blinking or turning on, a speaker 14 (sounding means) that is a sounding device informing about the focus state with voice or sound, an LCD display section 15 (display means) for displaying information, such as guidance for manipulation, received information, information of an image, text information, etc. a small-sized LCD display section 16 (display means) that is built into on the back of the body 10a and displays information, such as mail arrival information; a power supply key 17 wherewith power supply is turned on/off; a telephone function key 18 wherewith arrival, calling, switching of telephone functions, and operation determination are done; a mode key 19 wherewith various functions are changed; a cursor key 20 wherewith a selected object is moved vertically and horizontally; a shutter key 21 that is a shutter button to judge input of the camera 12; a dial key 22 made up of membrane keys to make dialing, such as input of a telephone number; a loudspeaker 23 wherewith a call is received; and a microphone 24 to input voice into the device. In this embodiment, although the speaker 14 is installed as a sounding device for informing the user of the focus state, the loudspeaker 23 may take a charge of this function.

The camera 12 is a 340,000-pixel CCD (Charge Coupled Device) (area type solid state imager) camera built into the portable telephone 10.

Each of the LCD display sections 15 and 16 consists of an LCD display of the dot-matrix structure, a PDP that is a back light, an EL, drivers, etc. When imaging, each of the LCD display sections 15 and 16 displays image information inputted from the camera 12 and also indicates the focus state. When not imaging, each display section 15, 16 displays a number inputted from the dial key 22, various screens for non-telephone functions, icons indicating an operational state of the telephone function, etc. Further, at stand-by time, a time is displayed, and personal information and a system state are displayed.

In this embodiment, the LCD display sections 15 and 16, the LED 13, and/or the speaker 14 are configured to indicate the focus state. This may be done by an arbitrary combination of the following: the focus state is indicated by the LCD display sections 15 and 16 as shown in FIGS. 4 through 7 that will be described later; the focus state is indicated by light emission of the LED 13; and the focus state is indicated with pronunciation by the speaker 14.

The power-source key 17, the telephone function key 18, the mode key 19, the cursor key 20, the shutter key 21, and the dial key 22 are all operated manually, and each key transfers the content of manipulation to a control unit 34 (FIG. 2) as information. In this embodiment, although the shutter key 21 is set as an independent key, functions of this and other keys may be allotted to other keys (for example, to the mode key 19).

Figure 2:
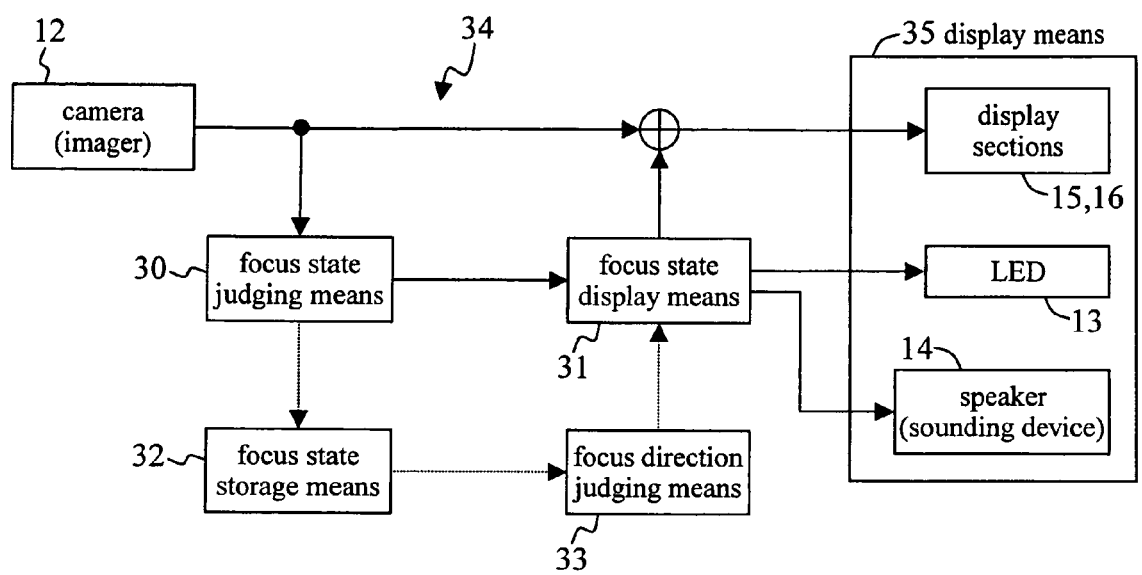
FIG. 2 is a functional block diagram in the case where a focus state display of this embodiment is built into a portable telephone with a camera.

FIG. 2 is a functional block diagram when the focus state display is built into the portable telephone with the camera 10.

In FIG. 2, the portable telephone 10 comprises: a camera 12 that is an imager for picking up an image; focus state judging means 30 for judging whether or not the image captured from the camera 12 is in a focus state; focus state display means 31 for indicating the focus state and a focus direction with an LED 13 and/or through the speaker 14; focus state storage means 32 for storing the temporal progress of the focus states of the images obtained by the focus state judging means 30 with the temporal progress of the captured images; focus direction judging means 33 for judging a focus direction from the temporal progress of the focus states obtained by the focus state storage means 32; display sections 15 and 16 each of which displays character information, image information, and a focus state; an LED 13 for indicating the focus state by its blinking or turning on; and the speaker 14 for informing about the focus state with voice or sound.

Figure 3:
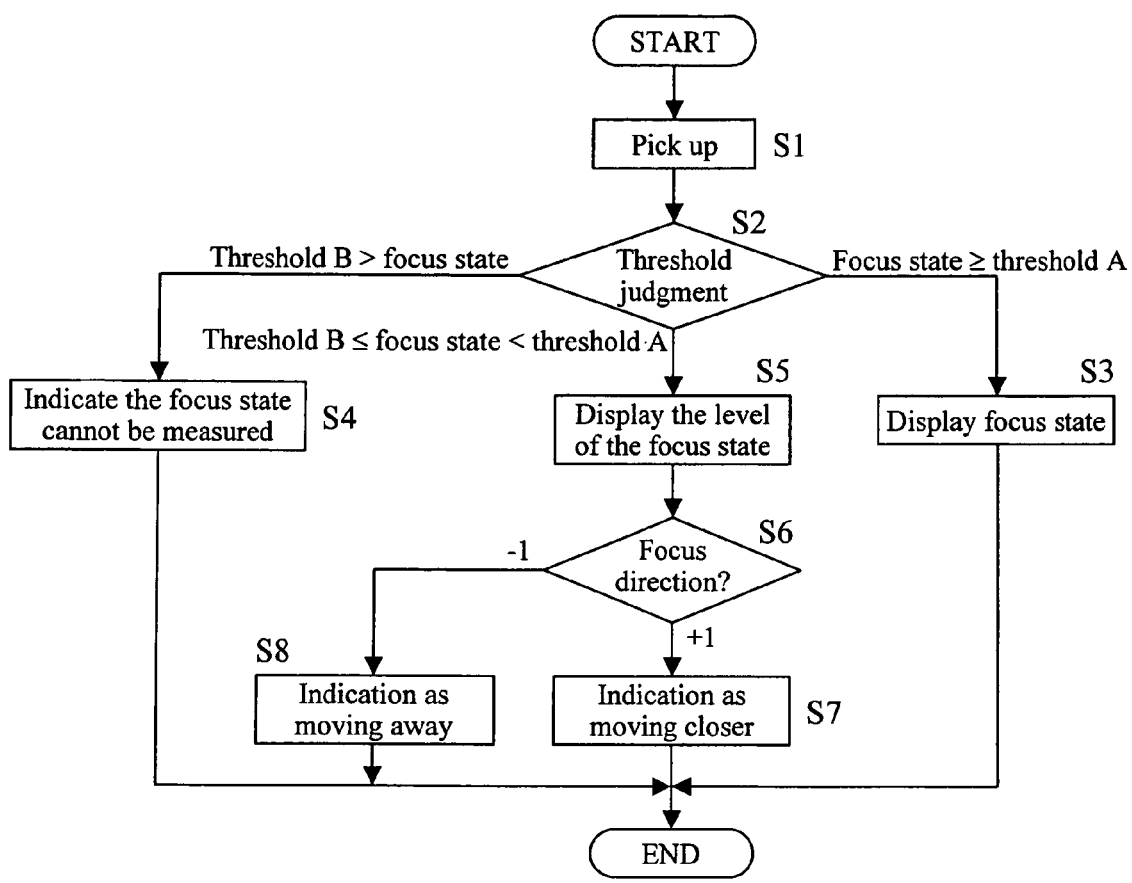
FIG. 3 is a flowchart showing processing of focus state indication of the portable terminal device of this embodiment.

The focus state judging means 30, the focus state display means 31, and the focus direction judging means 33 are made to constitute a system of focus state indication by a control unit 34 that consists of a CPU and controls the whole of this device, and the system performs the focus state indication control by executing a focus state indication program shown in FIG. 3. Moreover, specifically, the focus state storage means 32 comprises semiconductor memories, such as ROM storing a control program, fixed data, etc. and RAM serving as a working storage area, a hard disk, etc. The storage memory constituting the focus state storage means 32 stores receive or inputted character information, image information, and voice signals.

The ROM is read-only semiconductor memory for storing fixed data, such as a program and communication control data, necessary when the control unit 34 operates. The RAM is used as so-called working memory that stores temporarily the data related to bar code recognition and communication, data used for calculation, and calculation results, etc. A program that is processed in the portable telephone 10 is executed after being expanded on this RAM. Moreover, a part of RAM consists of EEPROM (electrically erasable programmable ROM) that is electrically rewritable nonvolatile memory. By changing a program written in the EEPROM, various specifications, especially of the portable telephone 10, can be changed. That is, recently, in order to avoid time loss in changing mask ROM for each debugging of system development, the program ROM is specified to be nonvolatile memory, for example, EPROM and EEPROM, so that a time required for program development and correction is intended to be shortened considerably. If the device is configured to be able to download a program and rewrite the contents of a program in the EEPROM, it becomes possible to upgrade its function or change functions by downloading a program and rewriting the content of a program in the EEPROM.

The above-mentioned display sections 15 and 16, LED 13, and speaker 14 constitute display means 35 for displaying and indicating various pieces of information to the user.

Operations of the portable telephone equipped with the focus state display configured as described above will be described below. First, operations as the whole will be explained.

When an image is picked up by the camera 12, the captured image will be sent to the focus state judging means 30.

The focus state judging means 30 judges whether or not the image captured from the camera 12 is in a focus state, and outputs a judgment result indicating a focus state to both the focus state display means 31 and the focus state storage means 32. The focus state is outputted to the focus state storage means 32 from the focus state judging means 30, and the focus state is stored with the temporal progress. The focus states are represented by values, for example, from 0 to 100, and larger the value, better the focus state becomes.

The focus direction judging means 33 judges the focus direction based on the temporal progress of the focus states stored by the focus state storage means 32. The focus direction is outputted as a value of "+1" or "−1" "+1" indicates that the in-focus state exists in a direction in which the imager moves closer to the object; "−1" indicates that the in-focus state exists in a direction in which the imager moves away from the object.

Then the focus state and the focus direction are indicated and/or pronounced by the LED 13 and/or through the speaker (sounding device) 14 operated by the focus state display means 31. In the case of monitoring by the display sections 15 and 16, the focus state indication is displayed on the image captured from the camera 12. In the case of the LED 13, the focus state is indicated by blinking or turning on of the LED. In the case of the speaker 14, the focus state is indicated with pronunciation from the sounding device.

FIG. 3 is a flowchart showing processing of focus state indication, which the control unit 34 repeatedly executes every predetermined time. S's in the figure show steps of the flow.

First, when an object is picked up by the camera 12 in Step S1, the focus state judging means 30 will judge a focus state based on the picked-up image in Step S2. As pre-stage processing of this the focus state judgment, the picked-up image is subjected to image processing of edge extraction, gain adjustment, contour compensation, etc. The focus state judgment is done by comparing the focus state of the image data having been subjected to this image processing with a threshold A and a threshold B. When the outputted focus state is equal to or more than the threshold A, the flow proceeds to Step S3. In Step S3, the image presently captured is judged to be in focus, the focus state display means 31 indicates that it is in focus, and this flow is terminated.

In the above Step S2, when the focus state is less than the threshold B, the flow proceeds to Step S4. In Step S4, the image is judged impossible to measure because the focus state has not been calculated correctly due to the brightness, the shape, and patterns of the object's image, the focus state display means 31 indicates that the focus state is the impossible measurement state, and this flow is terminated.

When the focus state is not less than the threshold B and less than the threshold A in the above-mentioned Step S2, the flow proceeds to Step S5. In Step S5, the level of the focus state is indicated by the focus state display means 31.

In this embodiment, when the level of a focus state is indicated, in order to know a focus direction, the display sections 15 and 16 display a message of "Please move the camera forward a little" etc. to the user, or the device guides the user with voice. If the user moves the camera 12 (portable telephone body 10a) forward closer to the object in response to this, the focus direction can be judged by comparing pieces of data of captured images that are stored in the focus state storage means 32 with the temporal progress thereof. In this example, the device can judge the focus direction as follows: if a difference between the focus state of an image picked up when the camera 12 was moved forward and the threshold A becomes smaller than a previous value, the device can judge that the focus direction is the forward direction; and if the difference becomes larger, the focus direction is the backward direction. In addition, this embodiment may be an embodiment where a mechanism for moving the focusing lens back and forth is built into the device, and accumulation of the focus states of the images may be performed automatically by driving the mechanism in the processing stage of the above-mentioned Step S5. With this configuration, it becomes unnecessary for the user to confirm the focus direction.

Subsequently, in Step S6, the focus direction judging means 33 judges the focus direction with the method described above. When the focus direction obtained by the focus direction judging means 33 is "+1," the device executes indication notifying the user that the in-focus state exists in a direction in which the imager moves closer to the object in Step S7 and terminates this flow. When the focus direction is "−1," the device executes indication notifying the user that the in-focus state exists in a direction in which the camera 12 moves away from the object in Step S8 and terminates this flow.

Note that in this embodiment, the device is configured to indicate both a focus state and a focus direction, but a sufficient effect can be expected only with indication of a focus state or indication of a focus direction.

An example of indication by the focus state display means 31 will be described below, referring to FIGS. 4 through 7.

Figure 4:
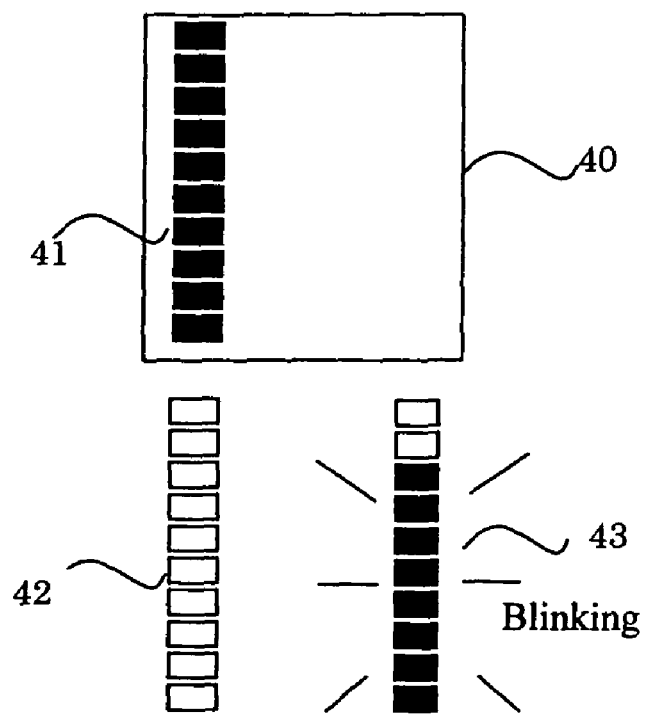
FIG. 4 is an illustration showing an example of display where the focus state of the portable terminal device of this embodiment is indicated with the number of graphic forms.

FIG. 4 is an illustration of an example of indication where the focus state is indicated with the number of graphic forms.

The numeral 40 in FIG. 4 is a display screen of an LCD display section 15 or an LCD display section 16, and the numeral 41 is focus state indication displayed on the display screen 40.

In FIG. 4, the focus state is indicated by the number of rectangular strip forms as shown by the focus state indication 41. When the focus state is the in-focus state, the in-focus state is indicated by blinking of the rectangular strip forms as shown by in-focus indication 43. When the focus state is a state where the measurement is impossible, the indication is displayed as shown by a display of impossible measurement indication 42. When the focus state is neither the in-focus state nor the impossible measurement state, the device displays rectangular strip forms, as many as a quotient obtained by dividing a number corresponding to the focus state by the number of rectangular strip forms.

Figure 5:
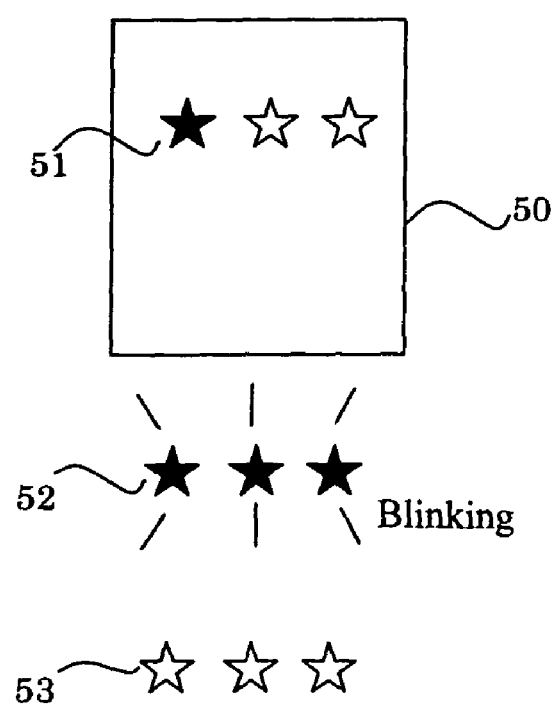
FIG. 5 is an illustration showing another example of display where the focus state of the portable terminal device of this embodiment is indicated with the number of graphic forms.

FIG. 5 is an illustration where the focus state is indicated by the number of graphic forms.

The numeral 50 in FIG. 5 is a display screen of the LCD display section 15 or the LCD display section 16, and the numeral 51 is focus state indication that is displayed on the display screen 50.

In FIG. 5, the focus state is indicated by the number of star forms as shown by the focus state indication 51. When the focus state is the in-focus state, the in-focus state is indicated by blinking star forms as shown by a display of in-focus indication 52. When the focus state is the impossible measurement state, the indication is displayed as shown by a display of impossible measurement indication 53. When the focus state is neither the in-focus state nor the impossible measurement state, the device displays graphic forms as many as a quotient obtained by dividing a number corresponding to the focus state by the number of star forms.

The above-mentioned graphic form showing the focus state indication is one example, any graphic form may be used as long as the user can recognize it.

Figure 6:
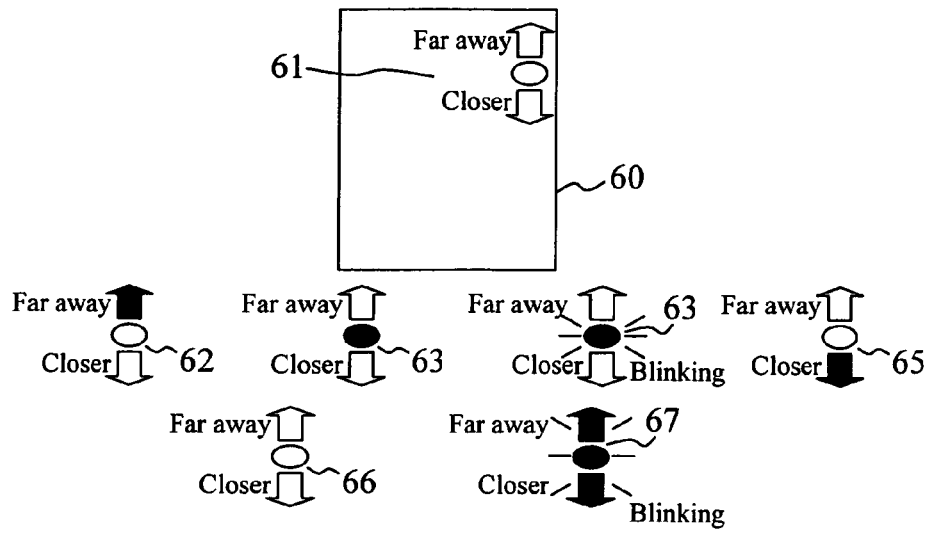
FIG. 6 is an illustration showing an example of display where the focus state and the focus direction of the portable terminal device of this embodiment are indicated with up and down arrow symbols.

FIG. 6 is an illustration showing an example where the focus state and the focus direction are indicated by up and down arrow symbols.

The numeral 60 in FIG. 6 is a display screen of the LCD display section 15 or the LCD display section 16, and the numeral 61 is focus state indication displayed on the display screen 60.

In FIG. 6, the difference in focus directions obtained by the focus direction judging means 33 is represented by up and down arrows as shown by the focus state indication 61. When the focus direction is "+1," an indication informing the user that the in-focus state exists in a direction in which the camera 12 moves closer to the object (indication 65 requiring the camera to become near) is displayed. When the focus direction is "−1," an indication (indication 62 requiring the camera to become away) informing the user that the in-focus state exists in the direction in which the camera 12 is moved away from the object is displayed. When the focus state is the in-focus state, in-focus indication 63 or in-focus indication 64 is displayed. When the focus state is the impossible measurement state, impossible measurement indication 66 or impossible measurement indication 67 is displayed.

Figure 7:
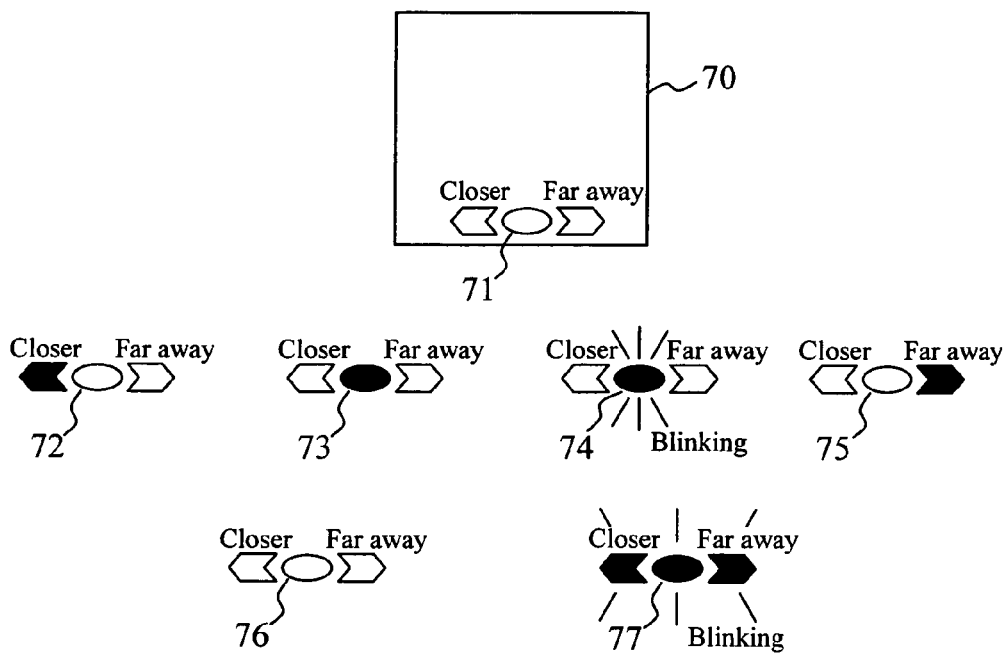
FIG. 7 is an illustration showing an example of display where the focus state and the focus direction of the portable terminal device of this embodiment are indicated with right and left arrow symbols.

FIG. 7 is an illustration showing an example of display in which the focus state and the focus direction are indicated with the right and left arrow symbols.

The numeral 70 in FIG. 7 is a display screen of either the LCD display section 15 or the LCD display section 16, and the numeral 71 is the focus state indication displayed on the display screen 70.

In FIG. 7, the difference in focus directions obtained from the focus direction judging means 33 is displayed with the right and left arrow symbols as shown by the focus state indication 71. When the focus direction is "+1," an indication (indication 72 requiring the camera to become near) informing the user that the in-focus state exists in the direction in which the camera 12 moves closer to the object is displayed. When the focus direction is "−1," an indication (indication 75 requiring the camera to become away) informing the user that the in-focus state exists in the direction in which the camera 12 moves away from the object. When the focus state is the in-focus state, in-focus indication 73 or in-focus indication 74 is displayed. When the focus state is the impossible measurement state, impossible measurement indication 76 or impossible measurement indication 77 is displayed.

The graphic form used for the focus state indication described above is one example. The graphic form is not limited to an arrow, and any symbol may be used as long as the user can recognize it.

Second Embodiment

The first embodiment is the example where the focus state is indicated on the display screen of the LCD display section 15 or the LCD display section 16. A second embodiment is an example where, in stead of or in addition to the indication by either of these display sections 15 and 16, the focus state is indicated by blinking or turning on an LCD 13 that the portable information terminal 10 has.

Since hardware configuration is the same as that of FIG. 1 and FIG. 2, its explanation will be omitted. Moreover, since a flowchart showing processing of focus state indication can be realized by the similar way of thinking as that of the above-mentioned FIG. 3, its explanation will be omitted.

In FIG. 2, when the focus state is the in-focus state shown above, focus state display means 31 is made to turn on the LED 13. When the focus state is the impossible measurement state, the LED 13 is not made to turn on or blink. When the focus state is neither the in-focus state nor the impossible measurement state, the LED 13 is made to blink every several seconds (see the processing in Step S5 in FIG. 3), where the "several" is, for example, a number obtained by dividing a predetermined number by the above-mentioned number corresponding to the focus state. By this, blinking becomes faster as the above-mentioned focus state becomes better, which can inform the user of the focus state.

Third Embodiment

A third embodiment is an example where the focus state is indicated by pronunciation of the speaker 14 that the portable information terminal 10 has in stead of or in addition to indication by the LCD displays 15, 16 and indication by the LED 13.

Since hardware configuration is the same as that of FIG. 1 and FIG. 2, its explanation will be omitted. Moreover, since a flowchart showing processing of focus state indication can be realized by the same way of thinking as that of FIG. 3 described above, its explanation will be omitted.

In FIG. 2, when the focus state is the in-focus state, the speaker 14 is made to emit a sound whose frequency is, for example, 2 kHz. When the focus state is the impossible measurement state, the speaker is made to emit a sound whose frequency is, for example, 100 kHz through the speaker 14. When the focus state is neither the in-focus state nor the impossible measurement state and when the focus direction is "+1" (the in-focus state existing in a direction in which the camera 12 moves closer to the object), as the above-mentioned case, the sounding device is made to emit a sound whose frequency is 1 kHz, and when the focus direction is "−1" (the in-focus state existing in a direction in which the camera 12 moves away from the object), the sounding device is made to emit a sound whose frequency is 500 Hz. By this, the device can inform the user of the focus state and the focus direction by means of a type of pronunciation.

As a variation, the device may be configured to have a built-in voice CODEC for processing an output signal from the focus state display means 31, as a sounding device, into a digital signal. The voice CODEC consists of a PCM (Pulse Code Modulation) sound source IC etc., and converts a signal received from the focus state display means 31 into a sound signal, which is outputted through the speaker 14. For example, when the focus state is the in-focus state, the voice CODEC emits actual human voice data that was recorded in advance, for example, ""focusing is achieved," "focused state," etc.; when the focus state is the impossible measurement state, the CODEC emits "impossible to measure," "cannot measure," etc.

Fourth Embodiment

Figure 8:
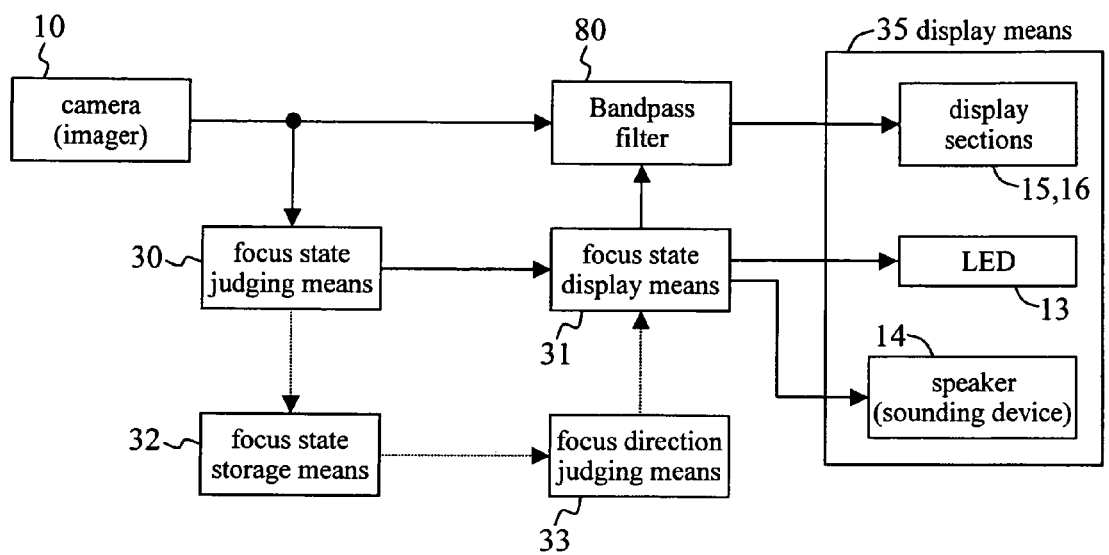
FIG. 8 is a functional block diagram in the case where a focus state display of a fourth embodiment of this invention is built into the portable telephone with the camera.

FIG. 8 is a functional block diagram in the case where a focus state display of a fourth embodiment of this invention is built into the portable telephone with the camera. The same constituents as those in FIG. 2 are designated with the similar numerals and double explanation of such constituents will be omitted.

In FIG. 8, a portable telephone of this embodiment is comprised of a BPF (BandPass Filter) 80 (filtering means) for eliminating high spatial frequency components of image data on the displays 15, 16 output side of the focus state display means 31.

The BPF 80 inversely transforms the image captured from the camera 12, for each block of 8×8 or 16×16 pixels, by means of orthogonal transformation of FFT (Fast Fourier Transform) or DCT (Discrete Cosine Transformation) or Hadamard transform or the like using only a specific range of frequency components of each block.

In the focus state display means 31, when the focus state becomes worse in checking the focus state obtained by the focus state judging means 30, the BPF 80 eliminates a wider range of high spatial frequency components, and the image data is displayed.

When the focus state obtained from the focus state judging means 30 is the in-focus state, the image captured from the camera 12 is displayed, as it is, on the display section 15 or the display section 16. When the focus state is the impossible measurement state, the image is subjected to orthogonal transform by the BPF 80, values consisting of only DC components (AC components are set to zero) are inversely transformed, and the image is displayed on the display section 15 or the display section 16. When the focus state obtained from the focus state judging means 30' is neither the in-focus state nor the impossible measurement state, the image is subjected to orthogonal transform by the BPF 80, and frequency components from the lowest frequency to a frequency whose figure is equal to the percentage of the focus state (other frequency components are set zero) are inverse-transformed, and the image thus processed is displayed on the display section 15 or the display section 16.

By this procedure, the worse the focus state is, the more blurred the image captured from the imager becomes, and consequently the device can inform intuitively the user of the focus state.

As described above, since the portable telephone 10 of this embodiment comprises: focus state judging means 30 for judging whether or not the image captured from the camera 12 is in a focus state; focus state display means 31 for indicating the focus state and the focus direction on the LED 13 and/or through the speaker 14; focus state storage means 32 for storing the temporal progress of the focus states of the images obtained by the focus state judging means 30 with the temporal progress of the captured images; focus direction judging means 33 for judging the focus direction from the temporal progress of the focus states obtained by the focus state storage means 32; display sections 15 and 16 each for displaying character information, image information, and the focus state; the LED 13 for indicating the focus state by emitting light; and the speaker 14 for informing about the focus state with voice or sound, so that the device can indicate the focus state information visually or aurally, and the user can easily confirm/adjust the in-focus state.

The above description is an illustration of the preferable embodiment of this invention, and the scope of this invention is not limited to this.

The above-mentioned embodiment is an example where the focus state display is applied to a portable telephone. However, the focus state display can be applied to any device as long as the device is a device equipped with a camera (internal camera or external camera), for example, a portable information terminal, such as PDA, and an information processing device, such as a portable-type personal computer, etc. Image information to be read may be any kind of information.

Although in the above embodiment, names of the focus state display and the portable terminal device were used. They were used just for convenience of explanation, and it natural that an in-focus state display, a communication terminal device, an in-focus state indication method, etc. may be used instead.

Although, in the above embodiment, examples of informing the users with graphic forms or symbols displayed on the display sections 15 and 16, and with voice or sound through the speaker 14, as informing means, were explained, a method of informing the user may be any method. For example, it is also possible to indicate a message that the focusing is not achieved or a message of "Please move closer to object a little" or to inform the user with voice or sound in addition to the indication on the display sections 15 and 16.

Note that circuit units constituting the above-mentioned portable terminal device, for example, kinds and numbers of storage units and displays, a connection method, etc. are not limited to the embodiments described above.

Moreover, the focus state display and the portable terminal device that were described above are also realized by a program for functioning the focus state display and the portable terminal device. This program is stored in a recording medium that can be read by a computer. In this invention, this recording medium may be main memory of the control unit 34 shown in FIG. 2 that works as a program medium, or may be a recording medium (program medium), such as CD-ROM, that can be read by a computer when it is loaded into a program reading device, such as a CD-ROM drive, that is installed as an external storage device. In any case, the device may be configured so that the CPU of the control unit 34 accesses a stored program and executes it. Alternatively, in any case, the device may adopt a method in which the program is read, the read program is downloaded in an unillustrated program storage area not illustrated, and the program is executed. This program for downloading shall be stored in each device in advance.

Here, the above-mentioned program medium is a recording medium made separable from the portable terminal device or the information processing device. The program medium may be (1) disk media of magnetic disks, such as magnetic tape and cassette tape, or (2) disk media of optical disks, such as CD-ROM, CD-R/RW, MO, MD, DVD-ROM, DVD-RAM, and DVD-RW, or (3) card disks, such as PC Card, Compact Flash Card (trademark registered), Smart Media (trademark registered), IC Card, SD Card (trademark registered), Memory Stick (trademark registered), or (4) media that carry programs fixedly including semiconductor memories, such as mask ROM, EPROM, EEPROM, and flash ROM.

Further, the program media may be a medium that carries a program fluidly in such a manner that a program is downloaded from a communication network through communication connecting means capable of connecting to an external communication network, such as an Internet connection provider and a server terminal 400. Incidentally, in the case where a program is downloaded from a communication network in this way, a program for downloading it may be stored in advance or may be installed from a different recording medium. The content stored in the recording medium is not limited to a program, but may be data.

INDUSTRIAL APPLICABILITY

As explained in detail above, according to this invention, the device can indicate the focus state information visually or aurally, so that the user can confirm/adjust the in-focus state.

If the focus state display having such excellent features to the portable terminal device whose monitor is small, such as the portable information terminal with an imager and the personal information terminal, checking the focus state becomes easy and enables the user to pick up correctly focused images.

The invention claimed is:

1. A focus state display comprising:
   focus state judging means for judging a focus state of an image captured from imaging means; and
   focus state display means for displaying information that indicates the focus state according to the focus state obtained by the focus state judging means on display means,
   wherein the focus state judging means determines a focus state value and compares the focus state value to a first focus state threshold and a second focus state threshold, the focus state judged to be in focus if the focus state value is greater than or equal to the first focus state threshold, the focus state judged to require adjustment to become in focus if the focus state value is between the first and second thresholds, and the focus state judged to be incompetent to indicate focus if the focus state value is below the second focus state threshold.

2. A focus state display, comprising:
   focus state judging means for judging a focus state of an image captured from imaging means;
   focus state storage means for storing temporal progress of the focus states of images obtained by the focus state judging means with temporal progress of the captured images;
   focus direction judging means for judging a focus direction from the temporal progress of the focus states obtained by the focus state storage means; and
   focus state display means that, according to the focus direction obtained by the focus direction judging means, displays information that indicates its focus state and focus direction on display means,
   wherein the focus state judging means determines a focus state value and compares the focus state value to a first focus state threshold and a second focus state threshold, the focus state judged to be in focus if the focus state value is greater than or equal to the first focus state threshold, the focus state judged to require adjustment to become in focus if the focus state value is between the first and second thresholds, and the focus state judged to be incompetent to indicate focus if the focus state value is below the second focus state threshold.

3. The focus state display according to either claim 1 or claim 2, wherein
   the focus state display means indicates the focus state obtained by the focus state judging means with a plurality of graphic forms as many as a number according to its focused state.

4. The focus state display according to claim 2, wherein
   the focus state display means indicates the focus direction obtained by the focus direction judging means with symbols.

5. The focus state display according to either claim 1 or claim 2, further comprising light emitting means, wherein
   the focus state display means indicates the focus state obtained by the focus state judging means by making the light emitting means blink or turn on.

6. The focus state display according to either claim 1 or claim 2, further comprising sounding means, wherein
   the focus state display means informs the user of the focus state obtained by the focus state judging means by making the sounding means emit sound.

7. The focus state display according to either claim 1 or claim 2, further comprising filtering means for eliminating high spatial frequency components of image data, wherein
   the focus state display displays the image data by removing a wider range of high spatial frequency components with the filtering means as the focus state becomes worse based on the focus state obtained by the focus state judging means.

8. A portable terminal device comprising imaging means for picking up an image and display means for displaying the image obtained by the imaging means, further comprising
   the focus state display according to claim 1.

9. A computer-readable recording medium characterized by recording a program that makes a computer execute a focus state display comprising:
   focus state judging means for judging a focus state of an image captured from imaging means; and
   focus state display means for indicating information about its focus state on display means according to the focus state obtained by the focus state judging means,
   wherein the focus state judging means determines a focus state value and compares the focus state value to a first focus state threshold and a second focus state threshold, the focus state judged to be in focus if the focus state value is greater than or equal to the first focus state threshold, the focus state judged to require adjustment to become in focus if the focus state value is between the first and second thresholds, and the focus state judged to be incompetent to indicate focus if the focus state value is below the second focus state threshold.

10. A computer-readable recording medium characterized by recording a program that makes a computer execute a focus state display comprising:
    focus state judging means for judging a focus state of an image captured from imaging means;

focus state storage means for storing the focus states of the images obtained by the focus state judging means with temporal progress of the focus states;

focus direction judging means for judging a focus direction from the temporal progress of the focus states obtained by the focus state storage means; and focus state display means for indicating information about its focus state and focus direction on display means according to the focus direction obtained by the focus direction judging means, wherein the focus state judging means determines a focus state value and compares the focus state value to a first focus state threshold and a second focus state threshold, the focus state judged to be in focus if the focus state value is greater than or equal to the first focus state threshold, the focus state judged to require adjustment to become in focus if the focus state value is between the first and second thresholds, and the focus state judged to be incompetent to indicate focus if the focus state value is below the second focus state threshold.

11. The focus state display according to claim 1, wherein if the focus state cannot be measured, the focus state cannot be calculated due to any of brightness, shape and patterns of the image.

12. The focus state display according to claim 2, wherein if the focus state cannot be measured, the focus state cannot be calculated due to any of brightness, shape and patterns of the image.

13. The focus state display according to claim 1, wherein the focus state display means indicates the focus state cannot be measured when the focus state judging means judges that the focus state is not capable of being measured.

14. The focus state display according to claim 2, wherein the focus state display means indicates the focus state cannot be measured when the focus state judging means judges that the focus state is not capable of being measured.

15. A focus state display comprising:
a focus judging section that judges a focus state of an image captured from a camera and
a focus state display that displays information that indicates the focus state according to the focus state obtained by the focus judging section,
wherein the focus state judging section determines a focus state value and compares the focus state value to a first focus state threshold and a second focus state threshold, the focus state judged to be in focus if the focus state value is greater than or equal to the first focus state threshold, the focus state judged to require adjustment to become in focus if the focus state value is between the first and second thresholds, and the focus state judged to be incompetent to indicate focus if the focus state value is below the second focus state threshold.

16. A focus state display, comprising:
a focus judging section that judges a focus state of an image captured from a camera;
a focus storage section that stores temporal progress of the focus states of images obtained by the focus judging section with temporal progress of the captured images;

a focus direction judging section that judges a focus direction from the temporal progress of the focus states obtained by the storage section; and a focus state display that, according to the focus direction obtained by the focus direction judging section, displays information that indicates its focus state and focus direction on a display, wherein the focus state judging section determines a focus state value and compares the focus state value to a first focus state threshold and a second focus state threshold, the focus state judged to be in focus if the focus state value is greater than or equal to the first focus state threshold, the focus state judged to require adjustment to become in focus if the focus state value is between the first and second thresholds, and the focus state judged to be incompetent to indicate focus if the focus state value is below the second focus state threshold.

17. The focus state display according to claim 1, wherein the focus state display means displays an indication informing the user that the in-focus state exists in the direction in which the camera moves closer to the object, or an indication informing the user that the in-focus state exists in the direction in which the camera moves away from the object.

18. The focus state display according to either claim 1 or claim 2, further comprising a sounding means, wherein
the focus state display means emits, via the sounding means, a voice that instructs the user of a direction to move the camera if the judged focus state is not in focus or impossible to measure, and informs the user of the focus state when the judged focus state is in focus and when the focus state is impossible to measure.

19. The focus state display according to claim 5, wherein the light emitting means is turned steadily on the focus state is judged to be in focus, and blinks when the focus state is judged to require adjustment.

20. The focus state display according to claim 19, wherein the light emitting blinks at a rate commensurate with the determined focus state value.

21. The focus state display according to claim 6, wherein the sound is emitted at a first audio frequency when the focus state is judged to be in focus, sound is emitted at a second audio frequency when the focus state is judged to be incompetent to indicate focus, and sound is emitted at third or fourth frequencies when the focus state is judged to require adjustment, the third and fourth frequencies being dependent upon whether the in-focus state is judged to exist in a direction in which the imaging means moves, respectively, closer to or away from an object of focus.

22. The focus state display according to claim 6, wherein the emitted sound is a reproduced human voice instruction.

* * * * *